United States Patent
Li et al.

(10) Patent No.: US 11,754,423 B2
(45) Date of Patent: Sep. 12, 2023

(54) INTELLIGENT SKIN BASED ON SMALL-SIZE DISTRIBUTED OPTICAL FIBER SENSING ARRAY

(71) Applicant: SHANDONG UNIVERSITY OF SCIENCE AND TECHNOLOGY, Qingdao (CN)

(72) Inventors: Lijun Li, Qingdao (CN); Tianzong Xu, Qingdao (CN); Qian Ma, Qingdao (CN); Zhaochuan Zhang, Qingdao (CN); Xiaolei Liu, Qingdao (CN); Jiajun Shen, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/906,258

(22) PCT Filed: Aug. 11, 2021

(86) PCT No.: PCT/CN2021/111982
§ 371 (c)(1),
(2) Date: Sep. 13, 2022

(87) PCT Pub. No.: WO2022/052724
PCT Pub. Date: Mar. 17, 2022

(65) Prior Publication Data
US 2023/0132161 A1    Apr. 27, 2023

(30) Foreign Application Priority Data
Sep. 9, 2020 (CN) .......................... 202010937653.8

(51) Int. Cl.
*G01D 5/353* (2006.01)

(52) U.S. Cl.
CPC ..... *G01D 5/35303* (2013.01); *G01D 5/35341* (2013.01)

(58) Field of Classification Search
CPC ..................... G01D 5/35303; G01D 5/35341
See application file for complete search history.

(56) References Cited

U.S. PATENT DOCUMENTS 5,380,995 A * 1/1995 Udd .................... G01D 5/35303
356/478
2017/0164878 A1* 6/2017 Connor .................. G09B 19/00

FOREIGN PATENT DOCUMENTS

| CN | 108786015 A | 11/2018 |
|----|-------------|---------|
| CN | 110181888 A | 8/2019  |

(Continued)

OTHER PUBLICATIONS

English Machine Translation of CN-113907762-A (Year: 2022).*
(Continued)

*Primary Examiner* — Dominic J Bologna
(74) *Attorney, Agent, or Firm* — HAUPTMAN HAM, LLP

(57) ABSTRACT

An intelligent skin based on a small-size distributed optical fiber sensing array. The intelligent skin includes an epidermis sensing array, an embedded optical fiber sensing array, a data collection system module, and a data processing mode recognition module. The body of the intelligent skin is made of a flexible material. The embedded optical fiber sensing array in an epidermis includes a plurality of all-fiber interferomatic sensing arrays. The data collection system module includes a broadband light source, an optical combiner/splitter, an optical path change-over switch, a signal detector and a computer. The data processing mode recognition module includes mode recognition and training of a neural network. The intelligent skin further includes an external display software used to perform intelligent sensing recog- (Continued)

nition for sense of touch, position, shape, and ingredient, temperature and vibration of an object and so on.

2 Claims, 1 Drawing Sheet

(56) References Cited

FOREIGN PATENT DOCUMENTS

| | | | |
|---|---|---|---|
| CN | 110532898 A | | 12/2019 |
| CN | 209727054 U | | 12/2019 |
| CN | 111006802 A | | 4/2020 |
| CN | 113907762 A | * | 1/2022 |
| WO | 2022/052724 A1 | | 3/2022 |

OTHER PUBLICATIONS

Lee, Jun Ho, et al. "A behavior-learned cross-reactive sensor matrix for intelligent skin perception." Advanced Materials 32.22 (2020): 2000969. (Year: 2020).*

Song, Jinxue, et al. "Research on pressure tactile sensing technology based on fiber Bragg grating array." Photonic Sensors 5 (2015): 263-272. (Year: 2015).*

International Search Report and Written Opinion issued in International Patent Application No. PCT/CN2021/111982; dated Nov. 15, 2021; 17 pgs.

Notification of Grant issued in corresponding Chinese Application No. 202010937653.8; dated Apr. 29, 2022; 3 pgs.

First Office Action issued in corresponding Chinese Application No. 202010937653.8; dated Nov. 17, 2021; 14 pgs.

Second Office Action issued in corresponding Chinese Application No. 202010937653.8; dated Jan. 21, 2022; 12 pgs.

Search Report issued in corresponding Chinese Application No. 202010937653.8; dated Nov. 9, 2021; 6 pgs.

Cui Jinhui et al.; Fiber Optical Intelligent Skin Tactile Sensor, Journal of Harbin Engineering University, vol. 23, No. 2, Apr. 30, 2002, pp. 82-86.

\* cited by examiner

INTELLIGENT SKIN BASED ON SMALL-SIZE DISTRIBUTED OPTICAL FIBER SENSING ARRAY

RELATED APPLICATIONS

The present application is a U.S. National Phase of International Application Number PCT/CN2021/111982, filed Aug. 11, 2021, and claims priority to Chinese Application Number 202010937653.8, filed Sep. 9, 2020.

TECHNICAL FIELD

The present invention relates to the field of intelligent optical fiber sensors, and in particular to an intelligent skin based on a small-size distributed optical fiber sensing array.

BACKGROUND

Sensor is a core component of an intelligent system and an internet of things, as well as a key to collect all data and realize intelligent sensing. Along with development of various intelligent systems and technologies, the importance of the sensor is further highlighted. Nowadays, the sensor production level of China lags five to ten years behind that of the developed countries, the accuracy of the scientific test instruments is 0.5 to 1 order of magnitude lower than that of similar products at home and abroad, and the intelligent sensors are not at a mature technical level. Therefore, carrying out research on novel sensors, sensing arrays and perfecting the existing sensor technology are of great strategic significance for the development of the industries, technologies and scientific researches of various countries.

The existing sensors have not reached the level of intelligent sensors which are capable of performing multi-point, multi-parameter and multi-dimensional measurement. More sensitive-point-integrated sensing elements and fabrication technologies are required to satisfy the information collection requirements of perfecting and accurately reflecting a substance change law such that the sensors develop toward the distributed networked intelligent sensors in the future. This is also an urgent problem to be solved in the development of current intelligent sensor technology.

SUMMARY

In order to solve the above problems, the present invention provides an intelligent skin based on a small-size distributed optical fiber sensing array, which is reasonably designed to overcome the shortages of the prior arts, generating good effect.

In order to achieve the above purpose, the present invention adopts the following technical solution.

There is provided an intelligent skin based on a small-size distributed optical fiber sensing array, including an epidermis sensing array, an embedded optical fiber sensing array, a data collection system module, and a data processing mode recognition module; wherein, the epidermis sensing array is placed on a surface layer of a flexible material and embedded into an epidermis via V-shaped grooves, a number of the V-shaped grooves is increased or decreased based on detection needs to perform detection for gas or liquid ingredients, and the sensors used are all-fiber interferometric sensors;

the embedded optical fiber sensing array is formed by a plurality of sensors embedded into the flexible material;

the data collection system module is configured to transmit measurement data and includes a broadband light source, an optical combiner/splitter, a transmission optical fiber, an optical path change-over switch, a signal detector and a computer;

the data processing mode recognition module is configured to pre-process data, perform mode recognition and convey the data into a neural network for training, including mode recognition and training of the neural network;

the intelligent skin further includes an external display software configured to perform intelligent sensing recognition and display for sense of touch, position, shape, and ingredient, temperature and vibration of an object and so on.

Preferably, the epidermis sensing array and the embedded optical fiber sensing array are based on an all-fiber distributed sensing array of an all-fiber interferometric sensor structure to perform fully-distributed sensing for pressure, sense of touch, object shape, friction within a small size range and ingredient and concentration of gas and liquid.

Preferably, for the intelligent skin, in order to embed the optical fiber sensor structure into the cured flexible material, a protective sleeve is added to each optical fiber ingress or egress port, where a material of the protective sleeve is plastic sleeve.

Preferably, the data collection system module transmits data in a wireless or wired manner.

Preferably, for the data processing mode recognition module, the data preprocessing includes data smoothing, data normalization, peak-peak value extraction, calculation of median, variance and mean, calculation of short time zero-crossing rate, and calculation of wavelet packet energy.

The present invention has the following beneficial technical effects.

1. A single sensor can be embedded into the structure of the small-size distributed optical fiber sensing array of the present invention, and the interference received by its surrounding sensitive region such as pressure can be sensed in a distributed way. Optionally, a plurality of all-fiber interferometric sensors may be embedded into the flexible material to form a sensing array so as to expand a sensing area based on actual requirements.

2. The intelligent skin of the present invention satisfies the requirements of miniaturization, intelligentization, multi-point and multi-parameter detection and systematization of modern intelligent sensors. By constructing a distributed multi-parameter intelligent optical fiber sensor system, the pressure, object shape, temperature, gas/liquid ingredient and friction etc. can be intelligently recognized and determined.

3. The intelligent skin of the present invention is encapsulated by using a flexible material to have the features of elasticity, lightness and skin affinity and is sensitive to external parameters like human skin. Based on the distributed sensing array, various types of information can be sensed in a fully-distributed way and multi-parameter and multi-point distributed sensing and intelligent recognition can be implemented using the neural network. In this way, the limitation of the existing intelligent sensors is overcome, and an important role is played in the fields such as intelligent skin, intelligent robot, industrial control facility, intelligent building, medical device, internet of things, inspection and detection, military application and aerospace.

BRIEF DESCRIPTIONS OF THE DRAWINGS

DETAILED DESCRIPTIONS OF EMBODIMENTS

The present invention will be further detailed below in combination with the accompanying drawings and specific embodiments.

In order to satisfy the requirements of miniaturization, intelligentization, multi-point and multi-parameter detection and systematization of modern intelligent sensors etc. and overcome the limitations of the existing intelligent sensors, the present invention provides a novel optical fiber sensing array to construct a distributed and multi-parameter intelligent optical fiber sensor system and an intelligent skin based on a signal processing method of a neural network. Based on a sensing mechanism of phase measurement, it is ensured that the system has sufficiently high sensing sensitivity. The distributed optical fiber sensing array enables the system to have the features of multi-point sensing and multi-parameter sensing capabilities. The signal processing technology of the neural network can not only satisfy the signal processing requirements of a large quantity of sensing data but also improve the intelligence level of the system.

Embodiment 1

The present invention provides an intelligent skin based on a small-size distributed optical fiber sensing array, including an epidermis sensing array, an embedded optical fiber sensing array, a data collection system module, and a data processing mode recognition module. The small size is proposed based on sensing of a line of several or dozens of kilometers to which the current distributed optical fiber sensors are mainly applied and it refers to any small range which can be understood as within several square centimeters or less.

Figure 1:
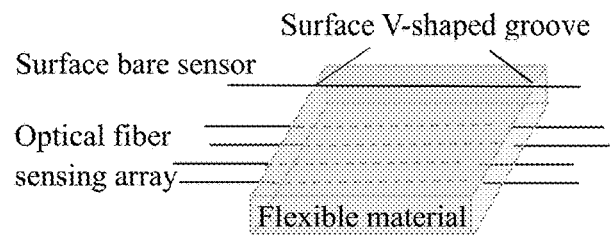
FIG. 1 is a schematic diagram of distribution of an optical fiber sensing array according to the present invention.

As shown in FIG. 1, the body of the intelligent skin is made of a flexible material into which all-fiber interferometric sensors are embedded to form a distributed optical fiber sensing array. Bare sensors are arranged on a surface of the flexible material and embedded into the epidermis through V-shaped grooves. The flexible material is in a liquid state initially and can be poured into one mould as required and then cured. The flexible material used has the features of elasticity, lightness and skin affinity and is sensitive to external parameters like human skin. Based on the distributed sensing array, various types of information can be sensed in a fully-distributed way and multi-parameter and multi-point distributed sensing and intelligent recognition can be implemented using the neural network. The surface V-shaped grooves include grooves of various diameters which are formed by placing corresponding V-shaped groove moulds on the surface of the flexible material during a curing process of the flexible material. In the present invention, a diameter of 150 microns is used. In the present invention, the all-fiber interferometric sensors are embedded 2 mm deep into the flexible material. When a single sensor is embedded, the interference received by its surrounding sensitive region can be sensed in a distributed way. In a case of large measuring range, deeper embedding can be carried out.

Figure 2:
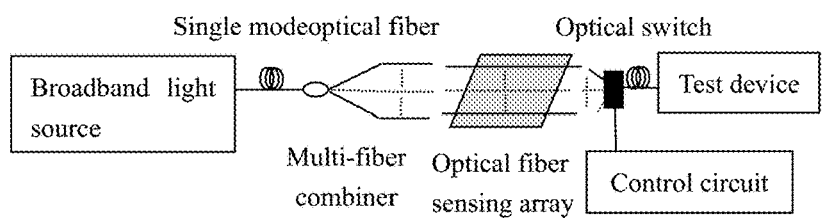
FIG. 2 is a schematic diagram of a test system of a sensing array according to the present invention.

As shown in FIG. 2, a test system of the sensing array of the present invention includes a broadband light source, a single-mode optical fiber, a multi-fiber combiner, an optical fiber sensing array, a control circuit, an optical switch, and a test device. The light source is connected to the sensing array through the multi-fiber combiner, and an output end of the sensor is switched by the optical switch to connect with the test device and sends measured data to an intelligent chip or computer in a wireless or wired manner.

The intelligent skin of the present invention further includes an external display software configured to perform intelligent sensing recognition for sense of touch, position, shape, and ingredient, temperature and vibration of an object and so on. The intelligent skin can function like human skin and play an important role in the fields such as intelligent skin, intelligent robot, industrial control facility, intelligent building, medical device, internet of things, inspection and detection, military application and aerospace.

Embodiment 2

In order to help understand the present invention and visually display the effect of the present invention in intelligent recognition, descriptions will be made below based on one example. Firstly, a data set is processed, and corresponding processing is performed for data by using Matlab. The process of the data processing includes data smoothing, data normalization, peak-peak value extraction, calculation of median, variance and mean, calculation of short time zero-crossing rate, and calculation of wavelet packet energy.

The data smoothing can be performed using a smooth function to remove data burr interference. The smooth function includes several methods such as moving, lowess, loess, sgolay, rlowess and lowess, where smooth coefficients of different degrees can be selected. The data normalization is performed using a self-contained normalize function to unify data to a uniform range. The peak-peak value extraction is performed using a self-contained findpeaks function, and valley value extraction is performed by obtaining one peak-peak value after data flip and then flipping data back. The calculation of the median can be directly carried out by using a self-contained median function and the median can reflect an energy size of the data entirety. The variance can be calculated using a var function to reflect a fluctuation degree of data. The mean can be calculated using a self-contained mean function to relatively accurately reflect the energy size of the entirety. The short time zero-crossing rate can be calculated as auxiliary data of the neural network to reflect a degree of data change. The wavelet packet energy can be extracted using a wavelet packet transform which has a higher resolution than the wavelet transform. The wavelet packet transform is developed based on the wavelet transform. The wavelet transform can process low frequency signals but high frequency signals whereas the wavelet packet transform solves the problems occurring to the wavelet transform.

After the derived data is converted into sample data required by the neural network, all data is stored for training of the BP neural network. A ratio of the sample data for training and check is adjusted properly. When the training accuracy rate reaches a desired level, training is automatically stopped and the training result is stored as a recognition function. After the training, the collected data can be recognized based on the following method: the preprocessed data is directly input into the recognition function and the recognition function is run to return a recognition result and a corresponding comparison probability.

Figure 3:
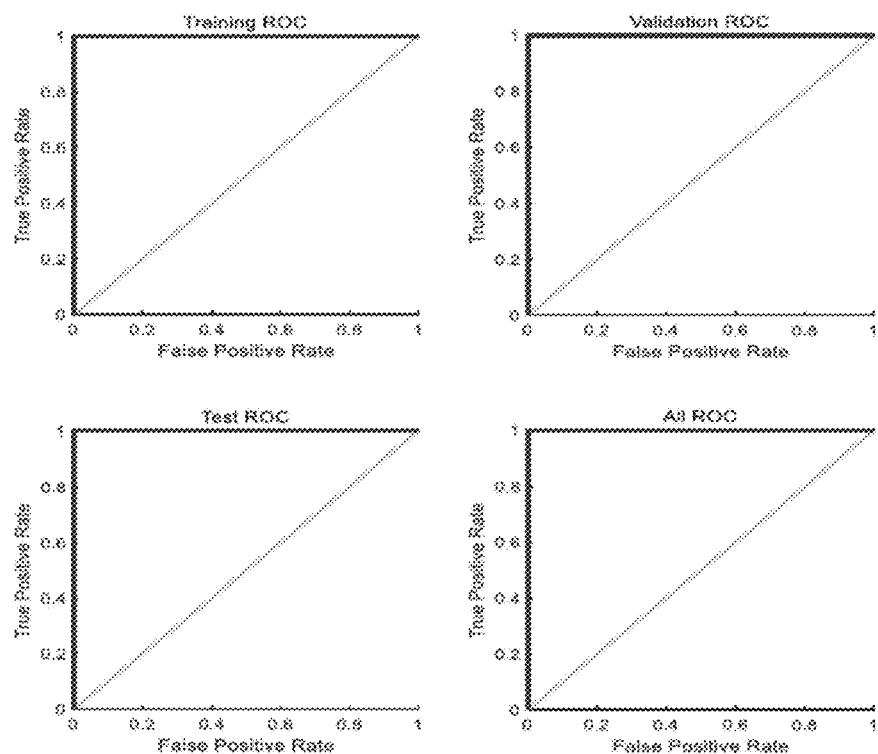
FIG. 3 is a curve of a back propagation (BP) neural network recognizing working features according to the present invention.

Finally, a tactile sensing experiment and a shape recognition experiment are carried out. FIG. 3 is a diagram showing a result of one shape recognition experiment. Based on the curve of the BP neural network recognizing working features, it can be seen that the recognition rates of the training data, verification data and test data all reach 100%. Good results prove that the present invention is feasible.

Of course, the above descriptions are not used to limit the present invention and the present invention is not limited to these examples. Any changes, modifications, additions or substitutions made by those skilled in the art without departing from the essence scope of the present invention shall all fall within the scope of protection of the present invention.

What is claimed is:

1. An intelligent skin based on a small-size distributed optical fiber sensing array, comprising an epidermis sensing array, an embedded optical fiber sensing array, a data collection system module, a plurality of sensors and a data processing mode recognition module;

the epidermis sensing array is placed on a surface layer of a flexible material and embedded into an epidermis via V-shaped grooves, a number of the V-shaped grooves is increased or decreased based on detection needs to perform detection for gas or liquid ingredients, and the plurality of sensors used are all-fiber interferometric sensors;

the embedded optical fiber sensing array is formed by the plurality of sensors embedded into the flexible material;

the data collection system module is configured to transmit measurement data and comprises a broadband light source, an optical combiner/splitter, a transmission optical fiber, an optical path change-over switch, a signal detector and a computer;

the data processing mode recognition module is configured to pre-process data, perform mode recognition and convey the data into a neural network for training comprising mode recognition and training of the neural network;

wherein the intelligent skin further comprises an external display software configured to perform intelligent sensing recognition and display for pressure, sense of touch, position, object shape and friction within a small size range, and ingredient, concentration, temperature and vibration of gas and liquid;

the epidermis sensing array and the embedded optical fiber sensing array are based on an all-fiber distributed sensing array of an all-fiber interferometric sensor structure to perform fully-distributed sensing for pressure, sense of touch, object shape, friction within a small size range and ingredient, concentration, temperature and vibration of gas and liquid;

the embedded optical fiber sensing array comprising an optical fiber sensor structure and a protective sleeve, the protective sleeve added to each optical fiber ingress or egress port of the intelligent skin to embed the optical fiber sensor structure into the flexible material;

the data collection system module transmits data in a wireless or wired manner;

the data processing mode recognition module is configured for data preprocessing comprising: data smoothing, data normalization, peak-peak value extraction, calculation of median, variance and mean, calculation of short time zero-crossing rate, and calculation of wavelet packet energy; wherein, data smoothing is performed using a smooth function to remove data burr interference, where the smooth function comprises several methods includes moving, lowess, loess, sgolay, rlowess and lowess, and wherein the smooth function comprises smooth coefficients of different degrees;

the data normalization is performed using a self-contained normalize function to unify data to a uniform range;

the peak-peak value extraction is performed using a self-contained findpeaks function;

the calculation of the median is directly carried out by using a self-contained median function and the median reflects an energy size of the data entirety;

the variance is calculated using a var function to reflect a fluctuation degree of data;

the mean is calculated using a self-contained mean function to reflect the energy size of the entirety;

the short time zero-crossing rate is calculated as auxiliary data of the neural network to reflect a degree of data change; and the wavelet packet energy is extracted using a wavelet packet transform to process high frequency signals.

2. The intelligent skin according to claim 1, wherein a material of the protective sleeve is plastic sleeve.

* * * * *